July 23, 1940.   H. G. BUSIGNIES   2,208,921
RADIO DIRECTING AND DIRECTION FINDING SYSTEM
Filed Nov. 20, 1936   3 Sheets-Sheet 1
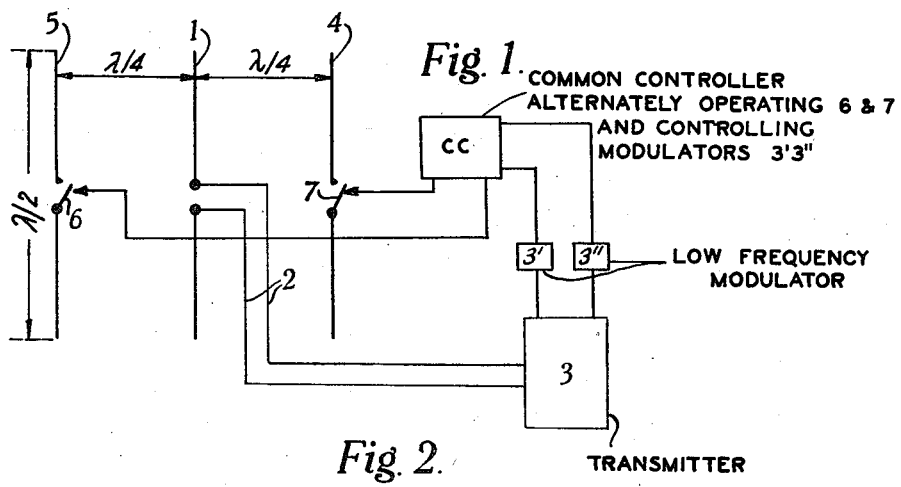
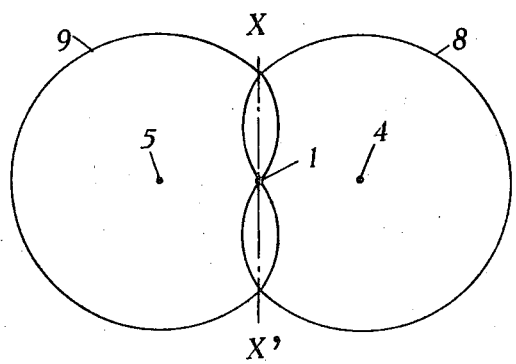
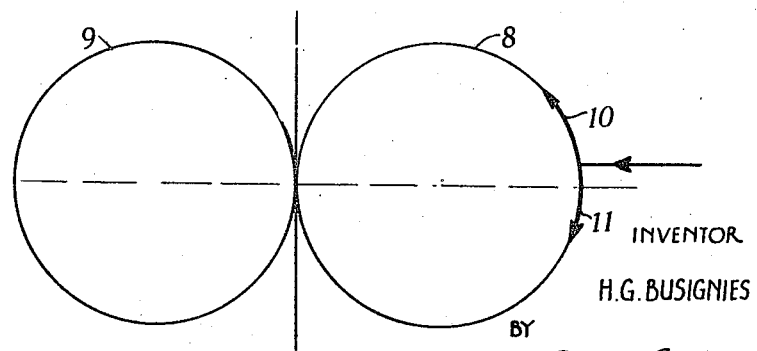
INVENTOR
H.G. BUSIGNIES
BY
ATTORNEY July 23, 1940.   H. G. BUSIGNIES   2,208,921
RADIO DIRECTING AND DIRECTION FINDING SYSTEM
Filed Nov. 20, 1936   3 Sheets-Sheet 2

INVENTOR
H.G. BUSIGNIES
BY
ATTORNEY

July 23, 1940.   H. G. BUSIGNIES   2,208,921
RADIO DIRECTING AND DIRECTION FINDING SYSTEM
Filed Nov. 20, 1936    3 Sheets-Sheet 3
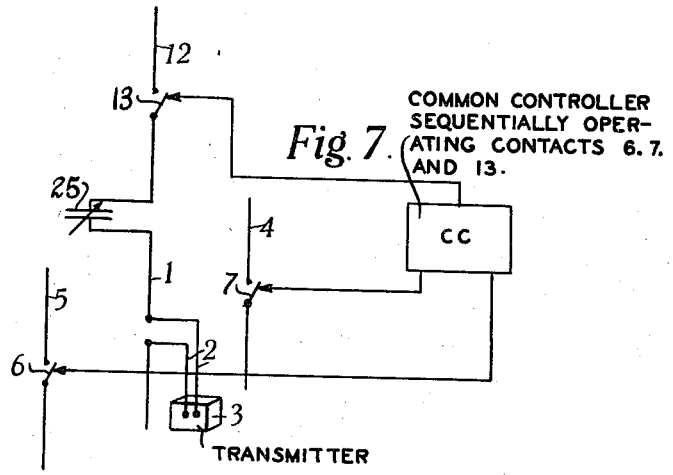
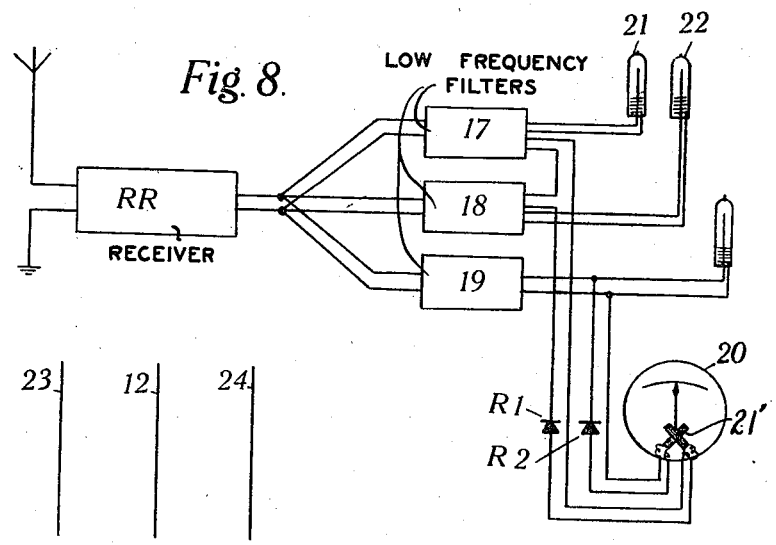
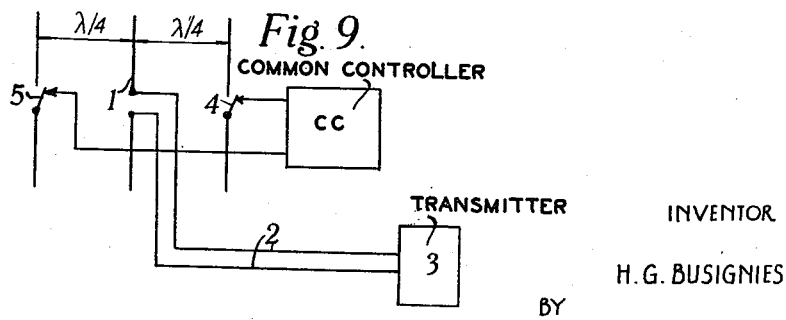
INVENTOR
H. G. BUSIGNIES
BY
ATTORNEY Patented July 23, 1940

2,208,921

UNITED STATES PATENT OFFICE 2,208,921

RADIO DIRECTING AND DIRECTION FINDING SYSTEM

Henri Gaston Busignies, Paris, France, assignor to International Standard Electric Corporation, New York, N. Y.

Application November 20, 1936, Serial No. 111,814
In France December 31, 1935

10 Claims. (Cl. 250—11)

The known systems of directing aircraft for example for landing without visibility based on the applications of radio-electric waves, may be represented as follows: first of all a radio beacon preferably on ultra-short waves permits the determination of the geographical position of the vertical plane which can lead the aeroplane to the landing place. The range of this radiation may vary from about 20 to 60 kms.

In order to warn the pilot that he is at a particular distance from the landing field, for example 4 kms., there is installed on the ground a radio emitter, of ultra-short waves for example, reception from which is effected by the receiving system installed on the aeroplane during the rather short time of the passage of the aeroplane above this transmitter; the reception of this signal enables the pilot to determine his position.

The pilot, who has been maintaining a well determined height, then begins his descent and in order to guide him in this operation a radio-transmitter preferable on ultra-short waves produces a directional radiation having such a form that in following a curve of equality of radio field, the aeroplane follows a correct landing trajectory which leads it to within a few metres of the ground. Often a second ultra-short wave radio transmitter is placed immediately on the boundary of the landing ground so as to indicate again to the pilot his position with respect to the ground.

It will be seen that these systems require the use of several wavelengths and three as a minimum; one for the radio beacon, one for the marker-beacons, and one for the transmitter providing the landing path; moreover, interference phenomena can considerably modify and confuse the results if a single wavelength were employed.

The reception of these wavelengths renders the installation on the aeroplane particularly complicated.

In order to avoid these disadvantages the invention provides for the use of one transmitter and of a single wavelength for both the trajectory and the beacon signals, the transmission being effected in two or more periods which are not necessarily equal; one of these periods can correspond to the transmission by radio beacon, another to the transmission in trajectory. The periodical phenomenon thus produced can be reproduced in the rhythm considered the best to obtain correct indication on the aeroplane, as will be seen later.

Moreover the special characters of the radio beacon transmission and of the trajectory transmission are such that the comparison at a distance of the electromagnetic fields due to these two transmissions may serve to characterize the distance. In this case it is thus possible to eliminate the transmission of the additional signals determining the approach and arrival at the field itself and thus there is obtained a system employing a single wavelength: thus on the aeroplane the receiver system need also be for a single wavelength.

A low frequency modulation of the frequencies proper to each transmission may be employed and in the receiver on an aeroplane a system of low frequency filters permits the selection of the transmissions corresponding either to the radio beacon operation or to the operation as the trajectory transmitter.

The invention will be better understood by means of the following description given in relation with the accompanying drawings in which:

Fig. 1 represents a radio transmitter with which is associated a directional antenna system;

Fig. 2 represents a corresponding directional diagram;

Fig. 3 represents a directional diagram of a dipole;

Figs. 6 and 7 represent improved antenna systems;

Fig. 8 represents a radio receiver for use on the aircraft;

Fig. 9 shows an improvement in the directional antenna system of Fig. 1.

Figure 4:
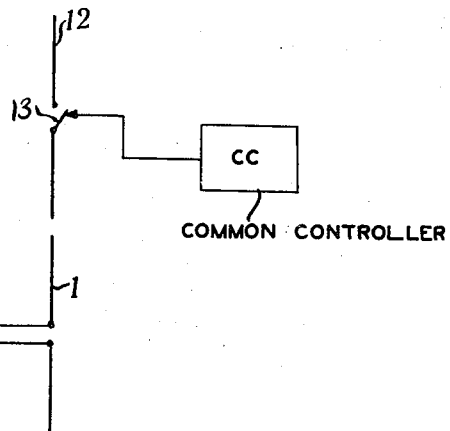
Fig. 4 shows an improved directional antenna system.

Referring first to Fig. 1, this shows a vertical dipole 1 fed by a transmitter 3 over a transmission line 2; the antenna system is completed by two reflectors comprising the dipoles 4 and 5, similar to the dipole 1, but provided with interrupters 6 and 7 which are either remotely or otherwise controlled to render the reflectors effective or ineffective.

Seen in a horizontal plane, the radiation diagram of such an antenna system is shown in Fig. 2, for a distance between the antennae 1 and 4 on the one hand and 1 and 5 on the other hand, equal to a quarter of a wavelength of the transmitter 3.

The diagram 9 is obtained when the interrupter 7 is closed and the interrupter 6 opened; the diagram 8 is obtained when the interrupter 6 is closed and the interrupter 7 is open.

It will be seen that on the axis X, X', the values of the electric field radiated are equal in both positions of the interrupters 6 and 7 shown above, and that this equality of electrical field may be sufficient to determine a vertical plane adapted to lead an aeroplane provided with an ultra-short wave receiver towards the landing place where the transmitter 3 is situated.

The radiation diagram 8 and the radiation diagram 9 may be successively produced one or more times per second by suitable operation of the interrupters 6 and 7. In order to characterize the diagram 8 and the diagram 9 it is possible with advantage to modulate the transmission at a certain low frequency for the transmission of the diagram 8 and at another low frequency for the transmission of the diagram 9. The position of the aeroplane in the plane X, X' will correspond to the equality of reception of two low frequencies of transmission successively received.

In Fig. 1, 3' indicates means for modulating transmitter 3 at one low frequency and 3'' indicates means for modulating transmitter 3 at another low frequency. These modulating means 3' and 3'' are controlled in synchronism with the actuation of interrupters 6 and 7 by means schematically represented by CC.

In order to realise the feature of the invention set forth above, the radio beacon transmission such as has just been described may be allocated to a certain fraction of the time of a transmission period, whilst another fraction serves for the trajectory path transmission.

It is known that the directional diagram of transmission in the vertical plane of a vertical dipole placed in space far above the ground and which can be represented by Fig. 3, comprises two portions 8 and 9. It will be seen that in this diagram the fact of following a curve of equality of field which is always of the same shape as the directive curve does not in any way permit a landing path to be obtained, the path followed being as indicated at 10 or 11.

Figure 5:
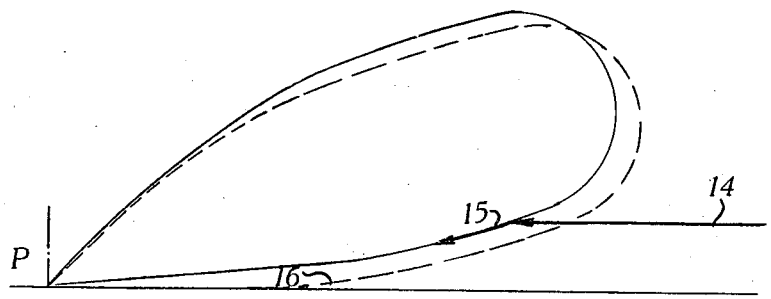
Fig. 5 represents the directional diagram in the vertical plane of this system of antennae.
Figure 6:
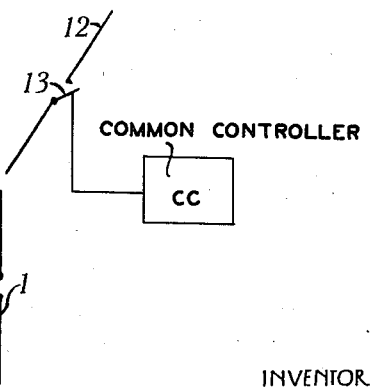

In order to ensure a suitable landing path, the present invention provides, as shown in Fig. 4, a system of antennae oscillating in harmony which is equivalent to a system of two superposed vertical dipoles, the second dipole being placed above, and in the extension of the fed dipole represented by 1. The transmission diagram in the vertical plane of such an antenna system is shown in Fig. 5. It will thus be seen that an aeroplane arriving in accordance with the direction of 14 and following the curve of equal field intensity follows a perfectly correct landing path 15 which is tangential to the ground at the point P. However, this transmission diagram, although considerably improved with respect to the diagram of Fig. 3, is still not entirely suitable since it brings the aeroplane far too near the system of aerial transmitters. In order that the point of contact of the aeroplane with ground may be displaced several hundreds of meters in front of the aerials P, in the direction of flight of the aeroplane, it is proposed as shown in Fig. 6, to incline the dipole 12 with respect to the vertical at a suitable angle. Under these conditions the curve shown in Fig. 5 is distorted as indicated in dotted lines on the same figure. The point of contact of the constant field lines with the ground is then situated at 16 in front of the aerial systems placed at P. Alternatively the distance between the nearest parts of the dipoles 1 and 12 may be varied from several millimeters to a considerable fraction of wavelength, thus permitting diagrams to be obtained such as those shown in dotted lines on Fig. 5, without the necessity explained above of inclining the dipole 12 forward or the desired diagrams may be obtained by the combination of these two effects. A variable capacity 25 may be provided between the nearest parts of the dipoles 1 and 12 either alone or in combination with the two above arrangements in order to obtain a diagram having a suitable shape and in particular a point of contact with the ground which may be adjusted by these means to the optimum distance from the transmitting aerials. Seen from the front the improved aerial system will appear as shown in perspective in Fig. 7.

When the interrupter 13 of the path dipole 12 is open, radio beacon transmission employing reflectors 4 and 5 and interrupters 6 and 7 is obtained, but if interrupters 6 and 7 are open and interrupter 13 is closed, operation for trajectory transmission is obtained. The time during which the transmission is effected by 1, 4, 5 (radio beacon) and the time in which the transmission is effected by 1, 12 (path) may be equal or different and the phenomenon may be repeated periodically at any desired frequency.

It is clear that the invention is not limited to the precise embodiments described. For example the known systems of multiplex transmission on a single wave length in order to transmit to a movable object a plurality of indications particularly concerning its position, height, etc., may be employed. In the same way very different forms of aerials may be used from those shown in the drawings merely by way of example and in particular the radio beacon and trajectory path transmissions may be effected by completely different antenna systems, while adhering to the principle of the successive transmission of the plurality of indications necessary to the pilot.

The installation on the aeroplane may comprise a single wave receiver RR, Fig. 8, followed by a system of low frequency filters 17, 18, and 19 for selecting the radio beacon transmission which comprises two different frequencies and the trajectory transmission which comprises a third. The frequencies of modulation characterising the successive operations may also be of high frequency and may be selected in the receiver on the aeroplane by the usual means for obtaining radio frequency selection.

It will be seen for example on the diagram of Fig. 8 that at the output of the low frequency filters 17, 18 and 19, currents will be obtained whose relative magnitudes will give the following indications: if the filters 17 and 18 are those which select the signals of the radio beacon transmission corresponding to the diagrams 8 and 9, Fig. 2, the equality of the outgoing currents of 17 and 18 will indicate to the pilot the position of the vertical plane which will lead him to the landing ground. Then if he maintains the current constant at the output of the filter 19 which will corespond to the selection of the low frequency proceeding from the trajectory transmission, the pilot will follow a landing curve 15 or 16 as shown in Fig. 5.

The comparison of the currents selected by filters 17 and 18 may be indicated shown by any known means, and rectifiers (not illustrated) may be provided in order to rectify the alternating currents proceeding from 17 and 18 in order to render easier the comparison of these direct current intensities. In the same manner the filter 19 may be followed by a rectifier (not shown) permitting the direct current control of a suitable device which indicates constancy of the intensity of the electrical field.

If the indicators have a sufficient inertia not to give variations of indication under the effect of the successive transmissions, the pilot will have the impression of a continuous indication giving the comparison of the intensities proceeding from 17 and 18, and in the same way will have the impression of a continuous indication of the intensity proceeding from the filter 19. The frequency of the cycle of operations may be increased in order to be able to reduce the inertia of the indicating apparatus.

It is preferred not to employ one common polarised direct current measuring apparatus for the comparison of the rectified currents proceeding from 17 and 18, because when the pilot is on the correct course the needle of the indicator apparatus is in a position which is also the position corresponding to zero current. The pilot thus does not know if the set is working and has to fly slightly off the course in order to test by a deviation of the indicator that the apparatus is still operating.

One of the objects of the invention is to avoid this by employing for example at the output of filters 17 and 18, two disassociated current indicators whose non-zero indications must be maintained equal in order to keep the aeroplane on the course. In particular there may be placed at the output of the filters 17 and 18 two neon tubes 21 and 22 of known type whose luminosity extends in length in proportion to the applied tension. The steering is then effected so that the two luminous columns are of equal length.

It will be noted that by increasing the frequency of the cycle of operations of the radio transmitter the pilot will have the impression of continuous luminosity of the neon tube, in view of the persistence of the luminous impressions on the retina of the eye.

In the filter 19, the indication may be obtained either by direct current apparatus not shown, preceded by a rectifier, or as before by a neon tube, the length of whose luminosity must be kept constant during the whole period of landing.

In order to avoid the reception of two wavelengths on the aeroplane, it is desirable to eliminate the use of marker beacons and the general feature which has been described above may permit this elimination in the following manner: the successive transmission at a given frequency of a radiation represented by the diagram of Fig. 2, then of a radiation represented by the diagram of Fig. 5 permits by the comparison between the relative intensities of successive signals a very exact appreciation of the distance after the relationship has been determined by practical experimenting or by theoretical examination of the question. In effect, at a long distance the signal transmitted with the diagram of Fig. 5 is received little or not at all, while the radio beacon transmission is made at a long range. Progressively as the transmitter is approached the reception of the diagram Fig. 5 becomes more and more intense with respect to the other method of transmission and at a given moment may become equal or greater. In general the ratio between two fields, large or small, or of whatever nature it may be, will vary continuously during the whole course of landing and each value of the ratio will clearly characterise a distance from the landing point whether the phenomenon is in proportion or logarithmic or of 2nd, 3rd or Xth degree. The measurement of the ratio may be effected by individual measurements of the respective intensities proceeding from the filters 17 and 18 or alternatively and preferably by an inertia apparatus which directly measures the ratio.

Fixed or variable shunts may be employed on a branch of the system of comparison if the ratio of the intensities to be compared varies over such wide limits that the apparatus for measuring the ratio cannot be employed with precision during the whole period of landing. This use of different shunts may clearly characterise the passage to points situated at a well defined distance from the point of contact with the ground. The apparatus in itself could be composed of a direct current indicator 20 comprising two frames 21', one of the frames being traversed by the rectified current from 17 and from 18, the other by the rectified current coming from 19, as shown in Fig. 8. Coupling which may result from the association of the output circuits of the filters 17 and 18, may be avoided by the use of multi-electrode vacuum tubes or by other known methods such as the use of a Wheatstone bridge etc.

This apparatus also has the advantage of enabling the pilot to start his landing on a well determined indication of this apparatus, while at the same time it avoids the use of marker beacons and permits the reception to be made on the aeroplane on a single wavelength.

In order to increase the security of the system it may be well to employ on the boundary of the landing place, a marker-beacon system employing an infra-red radiation transmitted by a projector fixed to the ground and modulated at a frequency determined by a mechanical device for interruption of the light.

On the aeroplane a photo-electric cell may be associated with the low frequency amplifier of the radio receiver, and with a supplementary filter selecting the low frequency chosen for the modulation of the infra-red radiation. Such an arrangement will permit of signalling to the pilot the passage through said marker-beacon either by illumination of a special neon tube or by the movement of a vane or of an indicator of any type.

It will be noted that one of the objects of the invention consists in the provision of the successive transmission of two forms of radiation, the one unsuitable for the trajectory, but of a rather wide horizontal range (Fig. 2) the other suitable for the trajectory, but of a poor horizontal range in view of the inclination of the radiation on the horizon (Fig. 5).

If the radiation of the diagram of Fig. 5 had permitted reception at substantial distances, it would have been unnecessary to split up the transmission into two periods and it would have been possible to combine diagram 5 with diagrams 8 and 9 by a system of antennae such as that shown in Fig. 9, in which the elements similar to those shown in Fig. 7 are designated by the same reference letters with, however, the addition of the dipoles 23 and 24 arranged as shown. The preceding arrangement will only be possible in the case in which it is desired only to guide the aeroplane from quite limited distances to the ground. The problem is more difficult in situations where it is desired to begin the guiding of the aeroplane at great distances from the landing ground in which case it has been found that the radiation obtained by the diagram of Fig. 5 used alone could not be employed.

The invention is obviously not limited to the embodiments described here simply by way of example, but on the contrary it is capable of general applications and can be employed at any time it is desired to guide a movable object by means of modulated waves.

What is claimed is:

1. In a system for landing aircraft by means of radio, a radio transmitter, means for causing said transmitter to emit a plurality of separate characteristic signals on a common wavelength whose relative strengths constitute an indication to the pilot of an aircraft the course to be flown on, and means for causing said transmitter to emit other characteristic signals of said common wavelength to indicate the trajectory to be followed in effecting the actual landing, said plurality of signals and said other signals being projected in overlapping relation whereby an indication of the point at which landing should be commenced may be obtained.

2. Transmitting arrangement for a radio guiding system for aircraft comprising a radio transmitter and an antenna structure, means for actuating said transmitter for a certain time interval to send characteristic signals on a certain wavelength and for simultaneously deforming the horizontal radiation diagram of the antenna structure to provide a course indication, and means for actuating said transmitter for another time interval to send other characteristic signals on the same wavelength and for simultaneously deforming the vertical radiation diagram of the antenna structure to provide a landing trajectory.

3. Transmitting arrangement for a radio guiding system comprising a transmitter dipole, a pair of reflector dipoles laterally disposed with respect to said transmitting dipole, means for alternately rendering said reflector dipoles active for deforming the horizontal radiation diagram to provide a course indication, a further reflector dipole disposed above said transmitter dipole and means for rendering said further dipole active for deforming the vertical radiation diagram to indicate a landing trajectory.

4. Transmitting arrangement for a radio guiding system, according to claim 3, comprising means for alternately bringing said pair of reflector dipoles and said further reflector dipole into operation.

5. Transmitting arrangement for a radio guiding system according to claim 3, in which said further reflector dipole is arranged in the line of extension of said transmitter dipole.

6. Transmitting arrangement for a radio guiding system according to claim 3, in which said further reflector dipole is inclined to the vertical.

7. Transmitting arrangement for a radio guiding system according to claim 3, in which said transmitting dipole is vertically arranged and said further dipole is arranged vertically above said transmitting dipole, comprising a variable capacity provided between the lower end of the said further reflector dipole and the upper end of said transmitter dipole.

8. In a transmitting arrangement for a radio guiding system, an antenna structure comprising a transmitter dipole and a pair of reflector dipoles laterally disposed on each side of said transmitting dipole adapted to produce lateral reflection, means for alternately rendering said reflector dipoles active for producing a radiation from which the direction of the transmitter can be determined and reflector dipoles arranged above the transmitter dipole and each reflector dipole and means for rendering active said reflector dipoles last mentioned for the purpose of deforming the vertical radiation diagram to provide a suitable landing trajectory curve.

9. In or for a system for landing aircraft by means of radio, a receiving apparatus comprising means for receiving signals for indicating the direction of a transmitting station, means for receiving other signals for indicating a landing path to be followed, and means for comparing the intensities of said two signals to provide an indication of the distance of the receiving apparatus from the transmitting station.

10. In a system for landing aircraft by radio signals, a radio transmitter, means for actuating said transmitter to emit a first characteristic radiation in accordance with a radiation pattern whose constant field strength lines correspond to a desired landing trajectory, means for actuating said transmitter to emit a plurality of further characteristic radiations according to radiation patterns whose equal field strength intersections correspond to a desired direction of flight, and means for causing the successive and repeated actuation of said actuating means each for a short time interval.

HENRI GASTON BUSIGNIES.